Nov. 11, 1924.
J. CUNNINGHAM
1,514,687
MOVABLE POWER TRANSMITTER
Filed March 6 1923
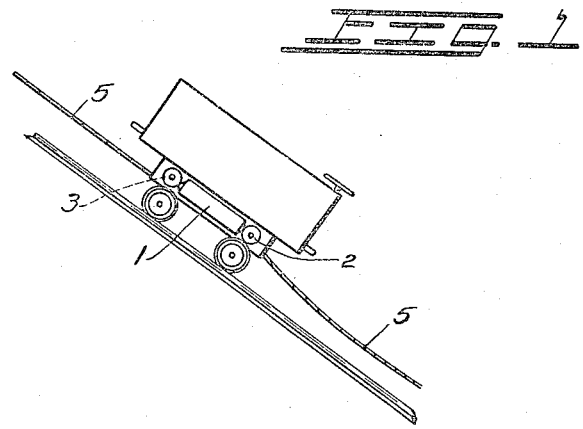
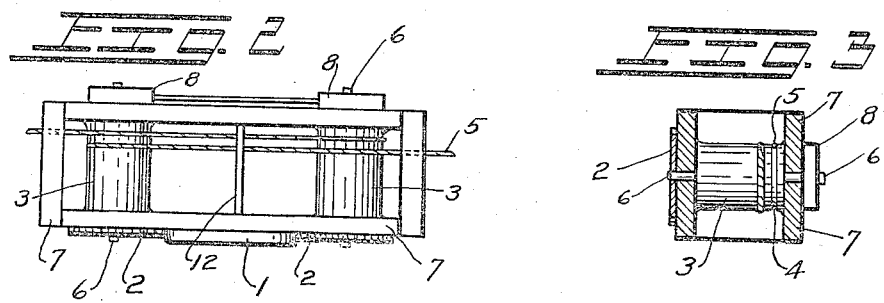
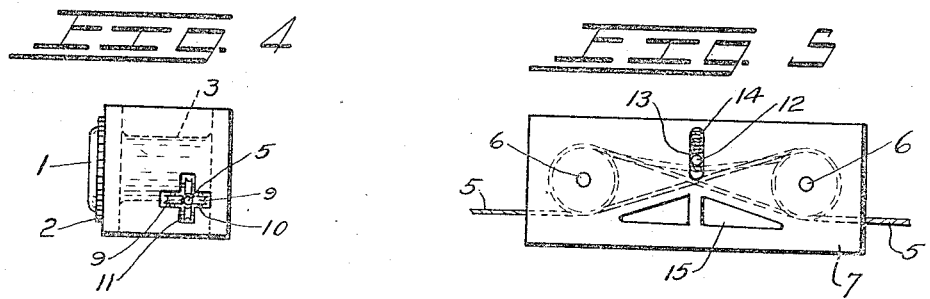
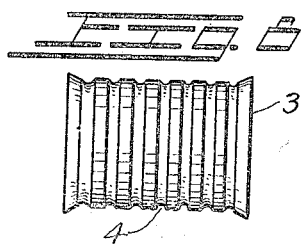
INVENTOR
John Cunningham
Harry Bowen
ATTORNEY Patented Nov. 11, 1924.

1,514,687

UNITED STATES PATENT OFFICE.

JOHN CUNNINGHAM, OF SNOHOMISH, WASHINGTON.

MOVABLE POWER TRANSMITTER.

Application filed March 6, 1923. Serial No. 623,304.

*To all whom it may concern:*

Be it known that I, JOHN CUNNINGHAM, a citizen of the United States, residing at Snohomish, county of Snohomish, and State of Washington, have invented a new and useful Movable Power Transmitter; and I do hereby declare that the following is a full, clear, and exact specification, such as will enable others skilled in the art to which it appertains to make and use the same.

The invention is a device whereby a machine may be driven up or down steep grades by its own power.

The object of the invention is to provide a device whereby a machine may be driven up a steep grade without danger of the wheels slipping.

Another object of the invention is to utilize a cable by winding it around spools for pulling a device up a hill.

And a further object of the invention is to provide a means whereby a car or motor may be driven up or down a steep hill which device is provided with a means for retarding the car or motor or for stopping it.

With these ends in view the invention embodies a car, motor or an engine with drums in it over which a cable may be placed, an engine or motor for driving the drums, and a brake for holding the drums.

Other features and advantages of the invention will appear from the following description taken in connection with the drawings, wherein:—

Figure 1 is a side elevation showing the frame in use.

Fig. 2 is a top plan view of the frame.

Fig. 3 is a cross section of the frame.

Fig. 4 is an end view.

Fig. 5 is a side view with the brakes omitted which shows a tightener for taking up the slack in the cable.

Fig. 6 is a view showing an alternate design of one of the drums.

In the drawings I have shown my device as it would be constructed wherein numeral 1 indicates the motor or engine, numeral 2 a means for driving the drums from the engine, numeral 3 the drums, numeral 4 grooves in the drums, and numeral 5 the cable.

The motor or engine 1 may be of any desired type and may be connected to the drums with gears, pulleys or a chain so that the drums may be driven by it. It is also understood that the drums may be driven in opposite directions in which case the cable would be crossed between them, as shown in dotted lines in Fig. 5. The drums may be fixedly mounted on a shaft 6 which is rotatably mounted in suitable bearings in the frame 7 and on one end of the shaft may be the driving gears 2 through which the drums are driven. On the opposite end of the shaft may be brakes 8 which may be constructed and operated in any suitable manner.

The rollers 9 may be placed on shafts 10 in openings 11 in the end of the frame so that the cables may pass through the rollers and thereby eliminate any possibility of friction that may be caused from the cable rubbing against the frame. Another roller 12 may be placed across the frame in slots 13 and held downward by springs 14 which will bear against the cable and automatically take up slack that may develop between the drums. Openings 15 may be placed in the side of the frame to reduce the weight and these openings may be of any desired shape and may be placed in any desired position.

In Fig. 6 I have shown an alternate design of one of the drums 3 which shows the grooves 4 extending all the way across the drum so that any number of coils of the cable that may be desired may be used.

It will be understood that changes may be made in the construction without departing from the spirit of the invention. One of which changes may be in the size or number of drums used, another may be in the means for holding the drums and still another may be in the means for embodying the drums in the car or motor.

The construction will be readily understood from the foregoing description. To use the device it may be embodied in a car as shown in Fig. 1 and it will be seen that when the engine or motor is stopped and the drum held by the brakes the car will remain stationary, and as the brakes are released and the motor or engine started the drums will wind the cable around them and the car will move either upward or downward. It will be seen that by the use of this device the car may be moved upward or downward by its own power and there will be no possibility of the wheels slipping on the track. It will also be seen that the motion of the car may be retarded by either applying the brakes on the drums or the ordinary brake on the car wheels. This device may be used on each individual car or on an engine or motor which may be used for pulling cars.

Having thus fully described the invention, what I claim as new and desire to secure by Letters Patent is:—

A frame that may be embodied in a car; a roller having grooves around it that may be rotatably mounted in the forward end of the frame; another roller having grooves around it that may be rotatably mounted in the opposite end of the frame; said frame having openings in its ends with rollers in them between which a cable that may be placed around the drums may pass; a roller held in slots in the sides of the frame and extending across it so that it will bear against the cable between the rollers; springs for holding this roller against the cable; and suitable brakes on the ends of the roller shafts for retarding the rollers around which the cable is placed.

JOHN CUNNINGHAM.